3,002,885
RED SQUILL TRACKING POWDERS

Morton Schwarcz, Berkeley Heights, N.J., assignor to Roberts Development Corporation, New York, N.Y., a corporation of New York
No Drawing. Filed Jan. 26, 1959, Ser. No. 788,722
4 Claims. (Cl. 167—46)

This invention relates to improved rodenticidal compositions and the employment thereof in the eradication of rodent populations. More particularly, this invention relates to improved tracking powders containing rodenticidal substances and the use thereof in the destruction of rodent populations. In one specific aspect thereof, this invention relates to tracking powders containing the rodenticidal principles of red squill and the employment thereof in the eradication of rodent populations.

The great economic waste occasioned by the depredations of various rodents is well known. Also, in addition to causing injury, destruction and/or contamination of valuable property and goods, some species of rodents are the usual hosts of vectors of certain human diseases such as bubonic plague, rickettsialpox and, perhaps, murine typhus. Also, rodents themselves harbor and transmit to man the causative organisms of certain diseases such as leptospirosis (Weil's disease), and the like. Accordingly, much effort has been expended in the development of methods and means for the destruction of rodent populations and for preventing or at least ameliorating the damage resulting from their depredations.

The destruction of rodent populations is extremely difficult. Many species of rodents, the rat for example, possess a highly developed native intelligence. Although a voracious feeder, the rat is suspicious of foreign odors and tastes and will reject a poisoned bait unless the presence of the poison is undetectable by taste or smell. In attempting to destroy rats by presentation of a bait containing a tasteless and odorless poison, a rat ingesting a sublethal dose of the poisoned bait can be marked down as a survivor of the attempt at destruction for such a rat will not ingest a second portion of the poisoned bait. Furthermore, there is no doubt that some healthy rats are capable of attributing symptoms of poisoning in other rats to the bait they have been ingesting and will accordingly avoid such bait.

As is well known, poison baits containing red squill (*Urginea maritima*, Baker) have been widely employed in attempting to destroy Norway rat (*Rattus norvegicus*, Berkenhout) populations. Ideally, a rodenticide should be completely non-toxic to domestic animals and humans. While it is probable that a material exhibiting such ideal differential action will never be discovered, red squill is undoubtedly the safest rodenticide presently available. Because of its strong emetic effect, red squill is effectively self-eliminating when ingested by domestic animals or humans (the rat does not regurgitate) and accordingly such ingestion, while giving rise to an unpleasant experience, is seldom lethal. Domestic fowl (eg. chickens) exhibit a high resistance to red squill.

Unfortunately, red squill containing baits are not too well accepted by the rat. Also, a considerable proportion of rats develop a pronounced bait shyness after ingestion of a sublethal dose of red squill containing baits and this shyness is seldom lost during the remainder of the life span of the rodent. Finally, red squill containing baits are quite ineffective for the destruction of the house mouse (*Mus musculus*, Linn.). While an individual house mouse causes much less damage than an individual Norway rat, as pointed out in the Fieldbook of Illinois Mammals, Hoffmeister and Mohr, Illinois Natural History Survey, Urbana, 1957, page 124, compared to the Norway rat, "It's small cousin, the house mouse, is less destructive individually, but because of its greater abundance causes almost as much total damage." Accordingly, the destruction of house mouse populations is an important problem and the ineffectiveness of red squill containing baits in this particular area represents a serious deficiency of such compositions.

I have discovered that tracking powders containing the rodenticidal principles of red squill provide highly effective means for the destruction of rodent populations.

Rodents are, in general, animals characterized by a high level of personal neatness. When no immediate opportunity for mischief presents itself, rodents frequently devote their time and energies to the grooming of their pelts, whiskers, feet and tails. I have found that the characteristic urge of commensal rodents to groom themselves is not discouraged by the taste of foreign substances clinging to the pelt, et cetera, of the animal. Also, it apears that rodents are not able to relate toxic symptoms produced by the ingestion of toxic materials during grooming to the act of grooming.

In one aspect thereof, the crux of my invention resides in placing a suitable powder containing the rodenticidal principles of red squill on surfaces over which the rodents travel or surrounding materials (e.g., food or feed) subject to the depredations of rodents. On traveling through such a powder the rodent picks up a portion thereof on his pelt, feet, tail, whiskers, et cetera. During the subsequent grooming operation, a large part of the powder removed from the pelt, et cetera, of the rodent is ingested by the rodent with fatal results.

Another aspect of my invention relates to powder containing the rodenticidal principles of red squill and suitable for use as described in the previous paragraph.

As mentioned previously, even though rodents may have developed a pronounced aversion to rodenticidal baits containing red squill, they will readily ingest a lethal dose of the rodenticidal principles of red squill during removal, through grooming, of the tracking powders of this invention from the pelt, whiskers, feet and tail. It has been clearly demonstrated that rats and mice will groom themselves after each one of a number of repeated exposures to the tracking powders of this invention in spite of the fact that food baits containing red squill were not acceptable to these experimental animals. Because of this unexpected behavior, by use of the tracking powders of this invention it is possible to destroy rats that have an inherent or an acquired aversion to red squill containing food baits and, in addition, it is also possible to eradicate mice, which apparently have an inherent aversion to red squill presented in the form of food baits.

Also, as has been indicated previously, even though rodents develop obvious biological responses characteristic of red squill poisoning as the result of ingestion of the tracking powders of this invention through the grooming operation, they are apparently unable to relate these symptoms to the grooming operation. As a result, a subsequent soiling of the pelt, feet, whiskers, tail, et cetera, by the tracking powders of this invention will also be removed (and largely ingested) by grooming even though the rodent is exhibiting toxic symptoms from a previous grooming operation.

One object of this invention is to provide an improved method and means for the desrtuction of rodent populations.

Another object of this invention is to provide a new and improved rodenticidal tracking powder and the use thereof in the eradication of rodent populations.

A further object of this invention is to provide a new and improved tracking powder containing the rodenticidal principles of red squill and the use thereof in destroying rodents.

Additional objects of this invention will become apparent as the description thereof proceeds.

Rodenticidal tracking powders prepared in accordance with my invention exhibit good adherence to the pelt, whiskers, feet and tails of rodents, remain free flowing after prolonged exposure to the atmosphere even under conditions of high humidity and are acceptable to such a degree that rodents will remove the tracking powder contaminating their pelt, et cetera, by a grooming operation and will ingest at least a considerable portion of such powder during this grooming operation. The tracking powders of my invention are sufficiently toxic to rodents to provide a means and method for the ready destruction of rodent populations.

The rodenticidal tracking powders of my invention are most conveniently prepared by admixing an extract of red squill with an inert support, drying as necessary, and then grinding the dried product to a fine powder. As is well known to those skilled in the art, a host of finely divided inert materials are available for use as supports and fillers in the preparation of insecticidal dusts and powders. These inert materials include such diverse materials as clays, anhydrous calcium sulfate, pyrophyllites (aluminum silicate), talcs (magnesium silicate), calcium silicate and the like. Such materials are eminently suited for use as the support portion of the tracking powders of my invention.

Also, as is well known to those skilled in the art, the toxic principles of red squill are readily extracted from the dried bulbs of the plant by alcohols, 80% ethanol being especially suitable for the purpose. The dried red squill of commerce (preferably of about 40 mesh size) is extracted with this solvent and the resulting solution is processed to achieve removal of the solvent therefrom through evaporation, preferably at a temperature below 75–80° C. The resulting extract is employed in conjunction with a support of the nature previously indicated to form the rodenticidal tracking powders of this invention.

Rodenticidal tracking powders of this invention have been prepared using inert supports of the nature previously indicated such as alumina, Attaclay (produced from attapulgite, a complex hydrated magnesium aluminum silicate type sorptive clay from around the Georgia-Florida boundary), talc, and the like. However, as a specific embodiment of a tracking powder in accordance with this invention, the following example describes the use of Micro-Cel (a synthetic calcium silicate of very small particle size produced by the hydrothermal reaction between diatomaceous earth and a source of calcium ions) as the inert support.

Example 1

A concentrated premix was first prepared as follow:

Ten parts by weight Cerelose (a commercial grade of glucose (dextrose)) were dissolved in 40 parts by weight water and 60 parts isopropanol were added to the resulting solution. The solution was agitated and 100 parts by weight of red squill extract were added thereto, agitation being continued until the extract dissolved with the formation of a thin syrup. The resulting syrup and 40 parts by weight Micro-Cel were worked together in a heavy paste mixer until a uniform mixture was obtained. The resulting moist mixture was spread onto trays and placed in an over heated to a temperature not exceeding 75° C. until the mixture lost approximately 50% of its original weight, from 16 to 24 hours usually being required to accomplish this weight loss. The resulting dried material was passed through a hammer mill to produce a final concentrated premix capable of passing a 200 mesh screen.

In preparing concentrated premixes as above generally described, red squill extracts showing a $LD_{50}$ of 150 mg. (plus or minus 50 mg.) per kilogram of body weight (against rats) were employed.

The method employed for the preparation of Micro-Cel has been previously indicated. A typical analysis of this material shows 25.3% calcium oxide and 51.7% silica with a loss on ignition at 1800° F. of 18.0%. Essentially all of this synthetic calcium silicate passes a 325 mesh sieve. It is marketed by the Celite Division of Johns-Manville Products Corporation.

If desired, the concentrated premix prepared as above described may be used as a rodenticidal tracking powder of this invention but this concentrate is considerably more toxic than necessary so it is preferably blended with additional inert to form the final rodenticidal tracking powders of this invention. The compositions of a number of such blends are set forth below:

| Tracking Powder Designation | A | B | C | D | E | F |
|---|---|---|---|---|---|---|
| Parts by weight: | | | | | | |
| Concentrated premix | 30 | 50 | 50 | 50 | 50 | 60 |
| Micro-Cel | 7.5 | | | | | 20 |
| Talc | 62.5 | 50 | 45 | 40 | 30 | 20 |
| Zinc stearate | | | 5 | 10 | 20 | |
| Total | 100 | 100 | 100 | 100 | 100 | 100 |

In the preparation of tracking powders A, B and F, which are devoid of zinc stearate, concentrated premix (through 200 mesh), talc (through 200 mesh) and, where called for in the above formulas, additional Micro-Cel, are placed in a double cone type or a Y type dry blender or similar device and thoroughly blended to form the rodenticidal tracking powders of my invention.

In making tracking powders containing zinc stearate (formulas C, D and E), 50 parts by weight of the concentrated premix (through 200 mesh) and the designated amount of powdered zinc stearate were first thoroughly mixed together to coat and waterproof all particles of the premix with a layer of zinc stearate. Following this the amount of talc (through 200 mesh) set forth in the above table was added and the resulting individual mixtures were separately blended as previously described.

All of the above formulations produced eminently satisfactory and highly effective rodenticidal tracking powders in accordance with this invention.

In this example a red squill extract was dissolved in a dilute alcohol (containing a little sugar) to produce, essentially, a solution such as may be obtained by extracting red squill powder with dilute alcohol. The particular procedure followed in this example was based on the nature of the materials at hand at the time the compositions were prepared. Obviously, it is not necessary to extract red squill powder with dilute alcohol, remove the solvent from the solution produced and then redissolve the extract in dilute alcohol. If a solution resulting from the extraction of a red squill powder with a suitable solvent (such as dilute alcohol) is available, it is obvious that such a solution may be used directly to impregnate the inert support. (Such solutions with a $LD_{50}$ (against rats) of 500 mg. per kilogram body weight are available commercially.) Knowing the bioassay of such a solution it is a simple calculation to determine the amount required to impregnate a given weight of inert support to produce, finally, rodenticidal tracking powders of this invention exhibiting a maximum $LD_{50}$ (against rats) of about 750 mg. per kilogram body weight and ranging downward to say 225 mg. per kilogram body weight or even somewhat less.

Also, as will be apparent to those skilled in the art, it is not necessary to make a concentrated premix and then dilute this with additional inert as described in Example 1 in order to prepare the rodenticidal tracking powders of this invention. If desired, the total requirement of inert support may be impregnated with the necessary amount of a solution of red squill extract to produce a final product of the desired bioassay (when dry), following which the impregnated material is dried and ground. However, by first making a concentrated premix and then diluting this with additional inert, an appreciable reduction in the size of equipment required for forming the paste, drying the paste and grinding the dried product is achieved as well as a considerable saving in utility consumption. However, it will be noted that this preferred procedure requires a dry blender and a dry blending operation which is not necessary if the total requirement of inert is impregnated with the necessary amount of the solution of red squill extract.

Various rodenticidal tracking powders of this invention were subjected to laboratory and field evaluations. To describe all this work would be largely redundant and accordingly the examples to follow are mostly confined to the presentation of results obtained in laboratory and field tests using the rodenticidal tracking powder designated C in Example 1. This particular rodenticidal tracking powder had a $LD_{50}$ (against rats) of 350 mg. plus or minus 50 mg. per kilogram body weight.

A standard arrangement was employed in all laboratory tests comprising two cages provided with a connecting runway of known dimensions. Feed was placed in one cage and water in the other. Both cages opened onto the runway and accordingly the test animals were afforded free access to both cages and the connecting runway. Movement of the test animals back and forth between cages via the connecting runway was obviously encouraged by placing feed in the one cage and water in the other. The tracking powder under test was distributed on the surface of the runway.

*Example 2*

Rodenticidal tracking powder (Formula C, Example 1) was distributed on the runway of the laboratory test arrangement previously described at a rate of 0.0156 pound per square foot (0.0076 g. per square centimeter). Five white footed mice (*Peromyscus leucopus*, Rafinesque) were employed as test animals. All five mice were dead at the end of three days.

*Example 3*

Formula C was distributed on the runway at a rate of 0.0308 pound per square foot (0.015 g. per square centimeter). Five adult male albino rats were used as the test animal. All were dead in six days. Three additional tests were made using adult male albino rats and tracking powders having the same gross composition as Formula C but differing from Formula C in the nature of the inert employed. In all three of these supplementary tests a complete kill of the test animals was attained within a few days.

*Example 4*

The runway was dusted with Formula C at a rate of 0.0121 pound per square foot (0.0059 g. per square centimeter). Four albino mice were used as test animals and all were killed in three days.

Laboratory tests demonstrated that the roof rat (*Rattus rattus*, Linn.) (which is comparatively rare in the northern interior region of the United States) has similar grooming habits and is just as vulnerable to the rodenticidal tracking powders of this invention as the common Norway rat.

The rodenticidal tracking powders of this invention have been the subject of an enormous number of field tests. To describe the procedures and results obtained in all these field tests would result in a specification of encyclopedic length and to describe the procedures and results of only those field tests involving the testing of (for example) Formula C, Example 1, would still result in a specification of inordinate length. Accordingly, in what follows, the results obtained in the field testing of Formula C only are summarized in the briefest possible fashion.

Field tests have been conducted at 26 different locations in Louisiana (all in Pointe Coupee or West Baton Rouge Parishes). The test locations comprised such diverse premises as farm feed mills, corn storage buildings, chicken feed storage buildings, potato storage buildings, chicken houses, outdoor toilets, residences, stores and restaurants and many of these individual field locations comprised two or more rodent infested buildings. The tests were run during June, July and August, a period characterized by frequent rains and generally high humidity. In spite of these unfavorable conditions, rodenticidal tracking powder C remained free flowing throughout the duration of the various tests if protected from direct contact with rain. Only in those instances where rain blew in cracks of buildings and fell directly on the tracking powder did caking or solidification of the powder occur.

In these field tests a six inch band of the tracking powder was formed, the length and conformation of the band being determined by the exigencies of the particular location involved. This tracking powder was originally deposited on these bands at rates varying from 0.025 pound tracking powder per square foot of band surface to 0.133 pound per square foot at the different test locations. In general, each field test location was visited at about weekly and, frequently, at even shorter intervals, say every three or four days, during the progress of the test. During each visit observations were made and frequently the amount of tracking powder removed by the rodents was estimated and this estimated quantity was replaced by addition of fresh tracking powder to the band. The sum of the original distributions of tracking powder plus the makeup powder added as just described varied from 0.042 pound per square foot to 0.6 pound per square foot at the various test locations. The duration of the individual tests varied from 8 days to 46 days, the average test covering a period of 29 days.

Each field test location had an infestation of one or more of the following rodent species: roof rats, Norway rats and house mice. Each species present at any one test location was considered to represent one exposure. On this basis the 26 locations could theoretically furnish a maximum of 78 exposures and actually furnished 41 exposures (24 locations infested with Norway rats, plus 15 locations infested with house mice, plus 2 locations with roof rats). The reports on these field tests were analyzed and the results graded in the same manner as is employed in judging the performance of other rodenticides in field tests. The resulting "overall percentage of success" was 82.9%. This was considered to be very good, especially so in view of the varied nature of the test locations, the lack of an extensive background of information covering the best method of presentation of the tracking powders, the rate of application to be employed, the adverse weather conditions that obtained, and the like.

In addition to the above, a mouse infestation in a furniture repair shop in another part of Louisiana was brought under control in four days by use of a tracking power of this invention. Two and one half months after the initial distribution of the tracking power of this invention it was still in free flowing condition but in view of the control of the infestation it showed no evidence of recent rodent tracking.

Still working in the approximate latitude of Louisiana, rats infesting a feed shed located on a farm in Mississippi were controlled with a tracking powder of this invention. The rat burrows and runways were treated with the tracking powder and the burrows were closed. Twenty days later the burrows still remained closed.

Finally, some field test results obtained on farms near Lexington, Kentucky, will be mentioned as exemplifying the action of the tracking powders of this invention at a more northerly location. The rats on one farm were controlled three days after distribution of a tracking powder of this invention. On another farm no evidence of rat activity could be observed two days after distribution of a tracking powder of this invention and accordingly control was rated very good. At this particular location two of the farm's cats were found sick the morning following distribution of the tracking powder of this invention but they rapidly recovered.

Be it remembered, that while this invention has been described in connection with specific details and specific embodiments thereof, these details and embodiments are illustrative only and are not to be considered limitations on the spirit and scope of said invention except in so far as these may be incorporated in the appended claims.

I claim:

1. The method of controlling a house mouse infestation comprising distributing over a surface traversed by said house mice a composition comprising a finely divided siliceous support impregnated with red squill extractives, the $LD_{50}$, against rats, of said composition being not greater than 750 mg./kg. body weight.

2. The method of controlling a house mouse infestation comprising distributing over a surface traversed by said house mice a composition comprising a finely divided aluminum silicate impregnated with red squill extractives, the $LD_{50}$, against rats, of said composition being not greater than 750 mg./kg. body weight.

3. The method of controlling a house mouse infestation comprising distributing over a surface traversed by said house mice a composition comprising a finely divided magnesium silicate impregnated with red squill extractives, the $LD_{50}$, against rats, of said composition being not greater than 750 mg./kg. body weight.

4. The method of controlling a house mouse infestation comprising distributing over a surface traversed by said house mice a composition comprising a finely divided calcium silicate impregnated with red squill extractives, the $LD_{50}$, against rats, of said composition being not greater than 750 mg./kg. body weight.

References Cited in the file of this patent

UNITED STATES PATENTS

| | | |
|---|---|---|
| 2,582,940 | Waletzky et al. | Jan. 15, 1952 |
| 2,648,682 | Stoll et al. | Aug. 11, 1953 |

OTHER REFERENCES

Munch et al.: American Pharmaceutical Association, pp. 27 and 28, January 1937.

Chitty et al.: Control of Rats and Mice, vol. I (Rats), pages 62–101, page 70 relied on, 1954.

Watkins et al.: Handbook of Insecticide Dust Diluents and Carriers, pages 224 and 228–9, 1955.